United States Patent
Bormann et al.

(10) Patent No.: US 10,053,216 B2
(45) Date of Patent: Aug. 21, 2018

(54) TETHERED WING SYSTEM FOR WIND ENERGY USE

(71) Applicant: ENERKITE GMBH, Kleinmachnow (DE)

(72) Inventors: Alexander Bormann, Berlin (DE); Stefan Skutnik, Bernau (DE); Christian Gebhardt, Berlin (DE); Maximilian Ranneberg, Berlin (DE)

(73) Assignee: ENERKITE GMBH, Kleinmachnow (DE)

( * ) Notice: Subject to any disclaimer, the term of this patent is extended or adjusted under 35 U.S.C. 154(b) by 527 days.

(21) Appl. No.: 14/428,511

(22) PCT Filed: Sep. 16, 2013

(86) PCT No.: PCT/EP2013/002782
§ 371 (c)(1),
(2) Date: Mar. 16, 2015

(87) PCT Pub. No.: WO2014/040747
PCT Pub. Date: Mar. 20, 2014

(65) Prior Publication Data
US 2015/0225080 A1    Aug. 13, 2015

(30) Foreign Application Priority Data
Sep. 17, 2012   (EP) .................................. 12006504

(51) Int. Cl.
*B64C 39/00* (2006.01)
*B64C 39/02* (2006.01)
(Continued)

(52) U.S. Cl.
CPC ............ *B64C 39/022* (2013.01); *B64C 31/06* (2013.01); *B64F 3/00* (2013.01); *F03D 5/00* (2013.01);
(Continued)

(58) Field of Classification Search
CPC . B64C 31/06; B64C 2031/065; B64C 39/022; A63H 27/08
See application file for complete search history.

(56) References Cited

U.S. PATENT DOCUMENTS 1,690,978 A * 11/1928 Jatunn ................... A63H 27/00
446/225
3,107,888 A * 10/1963 Finn ....................... A63H 27/08
244/153 A
(Continued)

FOREIGN PATENT DOCUMENTS

EP          2075461 T1   12/2007
FR       2 880 868 A1    7/2006
(Continued)

*Primary Examiner* — Richard R Green
*Assistant Examiner* — Michael B Kreiner
(74) *Attorney, Agent, or Firm* — Davis & Bujold PLLC; Michael J. Bujold

(57) ABSTRACT

A tethered passive wing system for the conversion of flow energy into electric energy which exhibits optimized aerodynamic and mechanical properties for reliable and efficient operation and is only connected through one or more tensile elements to a converter unit and comprises an optimized combination of rigid, non-flexural structural elements such as, for example, beams and shell structures and flexible fabric structures, such as, for example, membranes, films, laminates.

10 Claims, 5 Drawing Sheets

(51) Int. Cl.
  *F03D 5/00* (2006.01)
  *B64C 31/06* (2006.01)
  *B64F 3/00* (2006.01)
  *F03D 9/25* (2016.01)

(52) U.S. Cl.
  CPC .......... *F03D 9/25* (2016.05); *F05B 2240/921* (2013.01); *Y02E 10/70* (2013.01)

(56) References Cited

U.S. PATENT DOCUMENTS

| | | | | |
|---|---|---|---|---|
| 3,987,987 | A * | 10/1976 | Payne | B64C 39/022 244/153 R |
| 3,997,136 | A * | 12/1976 | Finn | A63H 27/08 244/153 A |
| 4,018,408 | A * | 4/1977 | Pearce | A63H 27/08 244/153 R |
| 4,072,284 | A * | 2/1978 | Arnstein | A63H 27/08 244/153 R |
| 4,168,816 | A * | 9/1979 | Acosta | A63H 27/08 244/154 |
| 4,198,019 | A | 4/1980 | Linczmajer | |
| 4,251,040 | A * | 2/1981 | Loyd | B64C 39/022 244/1 R |
| 4,742,977 | A * | 5/1988 | Crowell | A63H 27/02 244/123.1 |
| 4,846,424 | A * | 7/1989 | Prouty | B64D 17/025 244/145 |
| 5,033,698 | A * | 7/1991 | Schimmelpfennig | A63H 27/08 244/153 R |
| 5,524,851 | A * | 6/1996 | Huang | A63H 27/08 244/153 R |
| 6,286,786 | B1 * | 9/2001 | Le Gette | A63H 27/08 244/153 R |
| 6,523,781 | B2 * | 2/2003 | Ragner | A63H 27/002 244/153 R |
| 6,837,463 | B2 * | 1/2005 | Lynn | B64C 31/06 244/146 |
| 7,032,864 | B2 * | 4/2006 | Logosz | B64C 31/06 244/146 |
| 8,080,889 | B2 | 12/2011 | Ippolito et al. | |
| 8,505,293 | B2 | 8/2013 | Ahrens | |
| 8,534,609 | B2 * | 9/2013 | Stiewe | B64C 31/06 244/145 |
| 8,544,212 | B2 * | 10/2013 | Brown | B64C 3/30 244/123.11 |
| 8,684,313 | B2 * | 4/2014 | Harrington | B63B 35/7976 244/145 |
| 9,080,550 | B2 * | 7/2015 | Goldstein | F03D 9/002 |
| 9,178,241 | B2 * | 11/2015 | Davidson | B64B 1/50 |
| 2003/0066934 | A1 * | 4/2003 | Bolonkin | F03D 5/00 244/153 R |
| 2008/0083847 | A1 | 4/2008 | Mau | |
| 2010/0026007 | A1 * | 2/2010 | Bevirt | B64C 31/06 290/55 |
| 2010/0295303 | A1 | 11/2010 | Lind et al. | |
| 2011/0139053 | A1 * | 6/2011 | Specht | B63B 35/7976 114/102.29 |
| 2012/0248770 | A1 * | 10/2012 | Byun | F03D 1/025 290/44 |
| 2014/0070055 | A1 * | 3/2014 | Stiewe | B64C 31/06 244/155 A |
| 2014/0210212 | A1 * | 7/2014 | Hardy | F03D 5/00 290/55 |
| 2014/0361122 | A1 * | 12/2014 | Ruiterkamp | F03D 5/00 244/154 |
| 2015/0097086 | A1 * | 4/2015 | Schaefer | B64C 39/022 244/175 |
| 2015/0266574 | A1 * | 9/2015 | Ruiterkamp | B64C 31/06 244/154 |
| 2016/0207626 | A1 * | 7/2016 | Bailey | B64C 39/022 |
| 2016/0355259 | A1 * | 12/2016 | Vander Lind | B64D 1/08 |

FOREIGN PATENT DOCUMENTS

FR 2789129 8/2008
WO 2007122650 A1 11/2007

* cited by examiner

TETHERED WING SYSTEM FOR WIND ENERGY USE

FIELD OF THE INVENTION

The invention refers to a tethered wing system and its production for a wind turbine e.g. for the conversion of flow energy into electric energy which exhibits optimized aerodynamic and mechanical properties for the reliable and efficient operation and is only connected through one or more tensile elements to a converter unit and consists of an optimized combination of rigid, non-flexural structural elements such as, for example, beams and shell structures and flexible fabric structures, such as, for example, membranes, films, laminates. The invention-related wings exhibit very advantageous physical properties such as wing load, surface weight and performance yield.

BACKGROUND OF THE INVENTION, THE KNOWN PRIOR ART AND DISADVANTAGES

Airborne wind turbines are not connected to high structures fixed to the ground such as towers and poles. The flow energy of the wind is converted by the tethered aircraft into mechanical and electrical energy. The advantages of such systems are mainly in the fact that the high energy supply and the high uniformity of the wind at high altitudes, e.g. above 100 m, is possible with less material and at lower costs. Wind turbines which have a rotor on a ground-fixed structure are rarely realized higher than 200 m total height for both technical and economic reasons with the current state of technology. The masses and costs of the foundation and tower structure form a significant part of the expense which is almost entirely eliminated with airborne wind turbines. This makes it possible to lower the relative cost of airborne wind turbines compared with mast or tower-mounted wind turbines by designing the system for lower wind nominal speeds or higher nominal load availability. This leads to an equalization of the wind power supply and reduces expenses in the area of memory technology and distribution networks when used at inland locations.

There are several different concepts for such airborne wind turbines. Aircraft which are already converting wind energy into electrical energy and transfer this energy using a current-carrying tether to the ground, e.g. from US 20100295303 are well-known. Furthermore, there are concepts in which a mobile ground station is drawn by the aircraft on a trajectory or route on the ground, e.g. European patent specification EP 2075 461B1, as well as concepts in which a rotor located on the ground with a vertical axis is set into rotation by means of a towing aircraft with a tether of fixed length.

In rotor-driven wind turbines, the surface loads are typically 100-150 kg/m$^2$, which must be eliminated via the bending torque in the rotor hub. The dimensioning factors here are, in addition to the average static loads, especially the changing bending torques at the wing root due to the wind gradient and the dead weight as well as load peaks from the tower dam and gusty winds. Here, wings of fiber composite design with performance-related masses of 5-15 kg/kW for small wind turbines and 10-25 kg/kW for megawatt turbines are used. This is associated with a surface weight of 20-60 kg/m$^2$ for small and 50-150 kg/m$^2$ for large systems, so that the size and growth potential of this design is naturally limited. Alternative designs can be with tethered wings or screen designs. Tethered wings are typically designed for surface loads between 30-60 kg/m$^2$ and have a weight of approx. 100 kg/m$^2$ including fuselage and control surfaces. The screen designs used especially in the sport sector are typically designed for surface loads between 3-10 kg/m$^2$ and have a surface weight of approx. 0.1-0.2 kg/m$^2$.

Tethered wings are roughly divided into textile designs which get their shape retention in the following ways:

(i) Differential pressurization resulting from the inflow into the blades (ram pressure):

Ram pressure wings are used in parachutes and paragliders and sport kites as well as in wind propulsion sail systems for ships (sky sails) and in the development of airborne wind turbines. In this design the flow-induced pressure difference between the stagnation point and along the profile in the flow field is utilized. On the outer surfaces of the profile opened at the stagnation point, lower compressive forces are exerted than in the interior of the wing. The advantage of this design is possibly not having to use any rigid structural elements resulting in a minimal weight. The wings or screens unfold independently with the buildup of the inflow representing an increase in safety, in particular for paragliders, e.g. after a possible collapse. The disadvantages of this system are: (a) The easy collapse of the wing when there is no inflow also at the start because there are no rigid elements; (b) the need for a finely branched tethering for the load transfer, which leads to high air resistance and thus an aerodynamically inefficient wing and (c) reduced or missing efficient retrieval operation. A ram pressure wing with very low or negative angles of approach and accordingly low lift and drag coefficients cannot be flown due to the migratory ram pressure point, the special tethering and fluctuating inflow in turbulent air. Thus during recovery in the yoyo operation, virtually as much electrical energy is consumed as in the traction phase. For permanent applications, including those that do not involve the yoyo operation, the durability problem of seam connections and fabric take center stage.

(ii) Closed membrane parts under internal pressure (so-called tube kites): In water sports, tube kites (ii) have become popular because they can also be started easily even after a water landing. The tubes also allow a load concentration on the pressurized elements. Disadvantages of tube kites are, for example: Constant pressurization of structural elements is expensive, relatively heavy and prone to defects in the technical implementation. The design loses its rigidity in the event of possible leaks. Active pressurization to compensate for leakage increases the weight, energy consumption and costs in an undesirable manner. The famous sail-like designs also tend to flutter under certain inflow conditions which would affect the reliability and durability. The recovery operation is better realizable but is nevertheless also only possible in a limited manner in this design.

(iii) Rigid structure based on primarily fiber composites: Rigid structures ensure the best aerodynamic properties, where in aircraft construction and in the classical use of wind energy, the best lift/drag ratio, i.e. the best ratio of lift to drag is usually decisive. The drawbacks of known wing systems with rigid structure are as follows: The use of, e.g. a glider-like aircraft comes with high weights. The wings are so heavy that they cannot be started at wind speeds in the operating area of the system without additional tools. The lower switch on limit is relatively high with these wings, so less electricity is produced in the low wind range. The costs for wings of this construction are relatively high due to the materials used and manufacturing expenses. A combination of rigid and flexible design in the form of hang-gliders and delta wings is also known. Here, better lift/drag ratios can be realized with a structure that can be dismantled and is therefore transportable but only has surface loads of 7-10 kg/m² and wings sizes below 20 m².

THE OBJECT OF THE INVENTION

The technical systems of wind energy use should be able to be used safely, in an aerodynamically efficient and environmentally-friendly manner across the entire wind range of typically 0-25 m/s thus achieving a maximum benefit/cost ratio. For a wing system tethered using tensile elements, the requirement results in lightweight and durable surface elements for the efficient generation of lift, stabilization and control as well as an efficient connection system to one or more tethering lines. To ensure a safe flight and the controllability, the shape and dimensional accuracy of the wing is required because otherwise the desired aerodynamic and mechanical flight characteristics negatively change during operation. The influence of the lift of the wing is crucial for the force and performance control over the different modes of operation and in a broad wind range.

The yield of an airborne wind turbine working in yoyo operation is largely based on how much force the aircraft can transfer to the tensile elements (tethers) during the extension phase before it inadmissibly deforms or breaks. Based on the projected area of the tethered aircraft, this is termed a surface load, unit N/m². So that the dimensions of the tethered aircraft do not grow to an inappropriate size, high forces are to be created per surface and transferred to the tensile element. To do this, the aircraft must exhibit high aerodynamic lift ($cA=1-2$) over a broad operating range at low resistance incl. the tether line of ($cW=0.1-0.2$) and as low a weight as possible because the weight forces and the tether forces counteract each other. The limits of adaptability with regard to the weight and surface of the aircraft is, at low wind speeds, in the start capability of the flight device on the ground and in the required maintenance energy or towing capacity for flight conditions during lulls in the air. On the other hand, the yield of an airborne wind turbine working in yoyo operation significantly depends on the fact that the aircraft can be retrieved in the recovery phase in a short time, with minimal energy or at higher tether speed and low tether force. The aircraft must hence be capable of producing its lift and allowing a negative approach angle and still have flight and form stability and controllability. For the design of airborne wind turbines, lower design wind speeds of 6-10 than with previous wind turbines of 11-15 m/s are expedient. So that the wings do not reach dimensions which are too large, approx. 2-8 kW of usable energy should be converted per square meter of wing area.

Thus, the object of the invention was to make a wing system for wind energy use available which however is to have the above-mentioned advantageous properties especially in yoyo operation without the known and also mentioned above disadvantages in the known prior art.

SUMMARY OF THE INVENTION

The present invention relates to a wing system for wind energy use which operates mainly in so-called yoyo operation. This essentially consists of two phases. Phase 1 is characterized by the fact that the aircraft pulls up tethers with great force from a generator winch on the ground, which converts this mechanical energy into usable form. Phase 2 is characterized by the fact that the aircraft is operated so that the tether forces are lower than in Phase 1 and the aircraft is recovered with higher speed than in Phase 1 using as little energy as possible. A positive total energy balance at the ground station results in this yoyo cycle where the usable energy is released, if necessary, after a homogenization by a buffer.

The requirements described for the wings of kite wind turbines can be met due to the invention-related design without having to accept the disadvantages described in the previous wing construction. Essential characteristics of the construction method described here is the functionally coordinated and combined use of flexible components (e.g. textiles and film laminates) and rigid components, e.g. bending beams or shell constructions. The approach goes back to the accurate analysis of the functional requirements, the occurring loads, lifetime, costs of production expenses.

The invention-related wing system described here consists essentially of at least one stable aerodynamic lift surface consisting of one or more membrane sections (laminates, films, fabrics), profile elements that provide an optimized aerodynamic shape and concentrate the loads from the membrane sections, one or more bending torsion beams which reduce the surface forces and torques over the profile elements to a main tethering level, one or more stiffening elements that allow pretensioning of the membrane elements and fold and flutter-free usage and a mainly multi-part main tethering (5) (6) or wing bridle (12), which implement the load transfer to one or more main tethers thereby ensuring free rotation of the wing, not only around the vertical axis, but at least around the lateral axis and also, if necessary, around the roll axis. Due to the selected materials, functional elements and design, the invention-related wing system exhibits a surface load of greater than 30 kg/m², mainly 50-150 kg/m², and at the same time a surface weight of less than 20 kg/m², mainly 2-5 kg/m², and provides a performance yield of –2-20 kW, mainly 3-5 kW per square meter of wing area.

Unlike well-known aircraft, according to the invention, the problem exists of realizing two efficient operating points far apart from each other for 1. the energy in the working phase and 2. for the fast and efficient recovery phase. Well-known solutions use control systems that fly (Gondel (Skysails, TU Delft) or active flaps as in gliders (Ampyx)).

The invention-related design is however characterized by the fact that it allows controlled and efficient flight movements of a single passive aerodynamic surface in two completely separated operating points, where here, the control is done via retaining and control tethers only from the ground. In this way and only this way, it is possible for the first time to forgo active control in the wing.

The invention also includes the possibility of changing the aerodynamic properties via active actuated flaps, if necessary, controlled from the wing.

The invention includes the possibility to build the invention-related wing design from single, separate profile segments which can be coupled in modular construction where the necessary coupling points are mainly mounted in the area of the load transmission levels, i.e. the bridle points.

Surprisingly, it was found that through the selected design, the different rigid and elastic materials used, which can be joined together form-fitted and force-fitted according to the invention, as well as the use of a central bridle line (4), which conventional commercial systems do not have, excellent gliding and flying characteristics (aerodynamic resistance of $cW<0.20$, mainly $<0.15$; aerodynamic lift $cA>1.0$, mainly $>1.5$) with optimal energy generation ($>2$ mainly $>5$ kW/m² wing area) can be achieved by the raising and lowering of the wing, in particular in the yoyo operation by the ground station.

The invention-related wing design moreover shows a surface load mainly between 50-150 kg/m² wing area and at the same time exhibits a surface weight of mainly 2-5 kg/m² wing area. This means that in operation, a performance yield of 2-30 kW/² wing area, mainly 5-10 kW/m² wing area can be achieved.

The object of the invention is therefore an airworthy passive, wind-driven aerodynamic wing design which is capable of converting flow energy generated by wind into electrical energy, essentially including at least one wing consisting of fixed framework elements with flexible, elastic sail area elements as well as tether-guided retaining, tensile and extending devices (5, 6, 12) and controller (9) which are connected with a ground station, from which said wing design is operated and controlled, whereby (i) the wing has a profiled hard but elastic supporting crossbeam (2) in the span-wise direction of the wing which serves the wing leading edge as a base on which, via joints or other connecting elements (11), hard, non-flexible profile elements (8), which determine the shape of the wing, are attached whereby these profile elements are joined together under tension by a flexible membrane, laminate or film material as the upper sail (25) and a flexible membrane, laminate or film material as the lower sail (26) and form separate profile segments, and (ii) the wing for the load transfer in the area of the largest load impact has at least a central bridle line (4) in the middle of the wing or one rigid connection element (18, 19) in the middle of the wing, provided with a joint or bearing, so that the free rotation of the wing, including lateral and yaw movements is possible whereby the said fixed rigid parts are mainly connected to the elastic, flexible parts in a form-fitted manner. Preferably, the invention-related wing design has a non-branched or a single or multi-branched wing bridle (12, 13, 14) on the mainly one or multiple tensile tethers (5, 6) and/or one or more rigid connection elements preferably with joints (18, 19), which is arranged in the area of the profile spar (2) or the front part of the profile elements (8) to ensure optimal load transfer, without significantly altering the flight characteristics.

The object of the invention is moreover the use of such wing design for the production of electrical energy from wind power by means of different systems including conventional (rotor-driven) wind turbines.

The object of the invention is also a corresponding wind turbine or airborne wind turbine which are equipped with at least one invention-related wing design and obtain at least some of the energy from the invention-related wing design.

BRIEF DESCRIPTION OF THE DRAWINGS

The invention-related wing system can exist as already mentioned and designated, in various embodiments. Some of these are shown in the FIGS. 1-8 and explained in the following examples.

Example 1 (FIG. 1): describes the design of a wing system with tethering, includes a flexible, pliable surface element, a stiff, elastic bending torsional beam (spar), a connection of the central bridle line to the spar and to the wing main tether as well as external continuous bridle lines with an optional deflecting element to ensure the rolling degree of freedom, as well as an optional profile element with connection to the main and control tethers.

Figure 1:
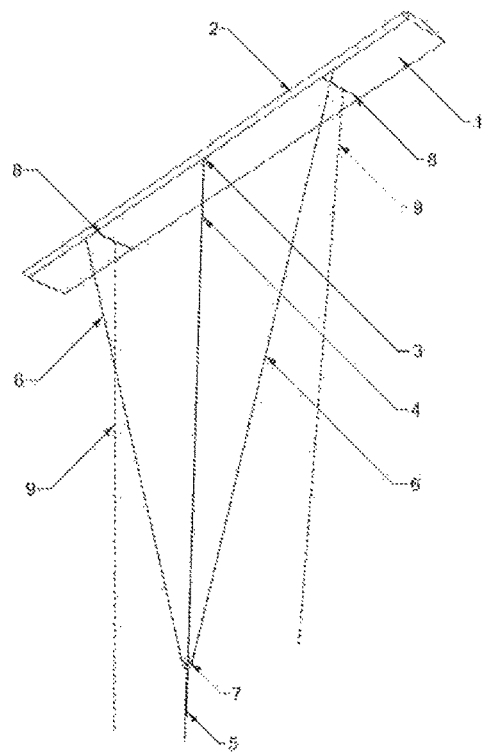
Figure 2:
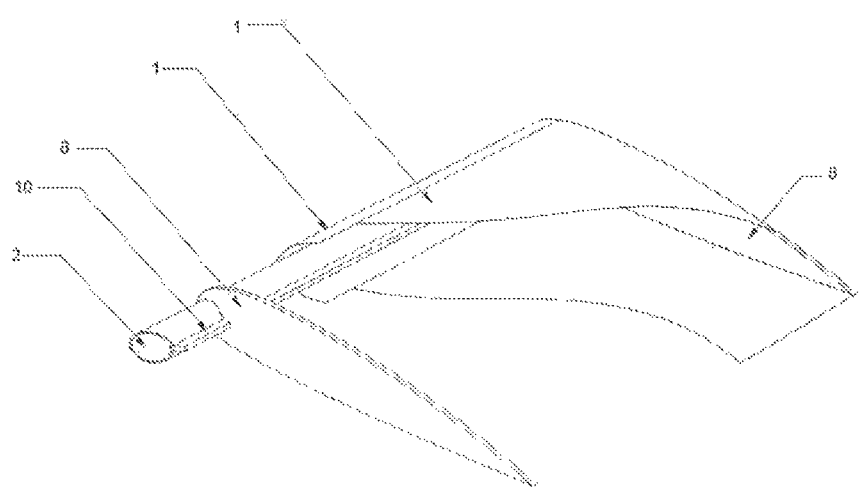

Example 2 (FIG. 2): describes another embodiment with the round or oval describes another embodiment with partially or completely rigid rib elements as well as pretensioned membrane elements connected on the round or oval spar in a form-fitting manner, where the spar is capable of absorbing pressure in the span-wise direction (through the pretensioning of the sail), as well as torsion and bending (from the aerodynamic forces which are initiated via the profile elements). The profile spar is bordered on its front edge with a movable flexible membrane film (1a), which is connected to the flexible pliable surface membrane (1) form and force-fitted forming the upper sail (25) and lower sail (26) of the wing design.

Example 3 (FIG. 3): shows another embodiment with a spar in D-profile and several fixed and rigid and torsion-resistant profile elements (8), which can have a perforated structure for weight reasons, with fixed or articulated connected rib elements (8), as well as pre-stressed membrane elements (1). The D-shaped spar is bordered with a movable flexible membrane film (1a), which is connected to the flexible pliable surface membrane (1) form and force-fitted forming the upper sail (25) and lower sail (26) of the wing design. The flexible membrane elements (1) (1a) can be connected to profile elements (8). They are adapted according to the applied loads from aerodynamic forces and the pretensioning in the materials and joining technology or with local doubling.

Figure 3:
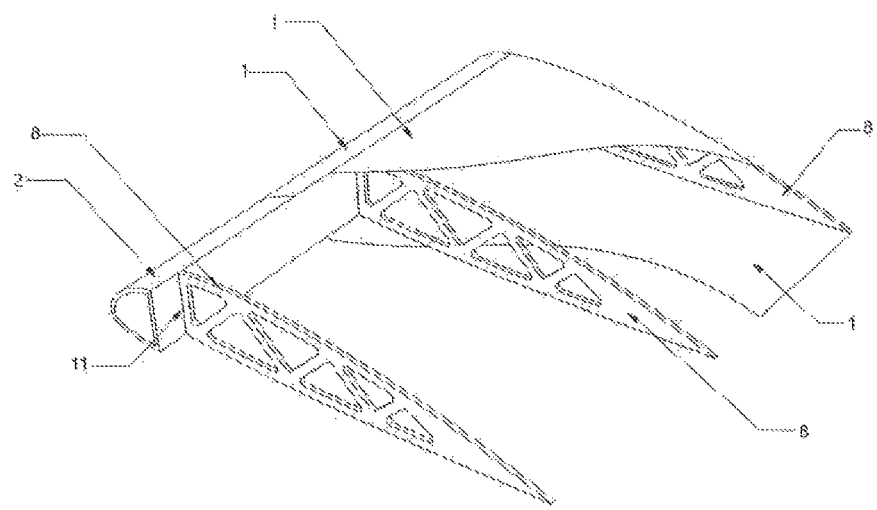

Example 4 (FIG. 4) shows a cross-section of the invention-related wing from FIG. 3. A lateral and transverse wing bridle is pictured on the bottom of the D-shaped spar which is responsible for the load transfer to the ground station. The wing has a tethering (9) on the rear edge of the wing.

Figure 4:
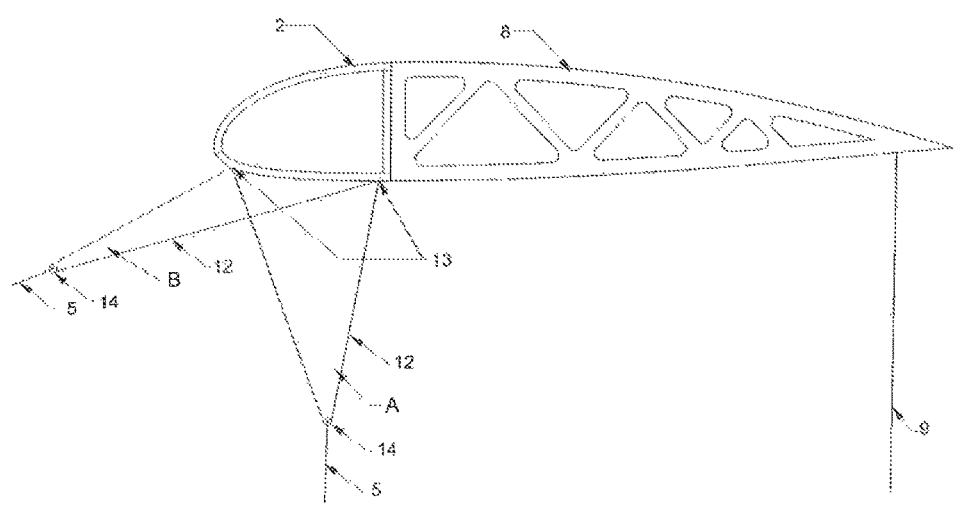
Figure 5:
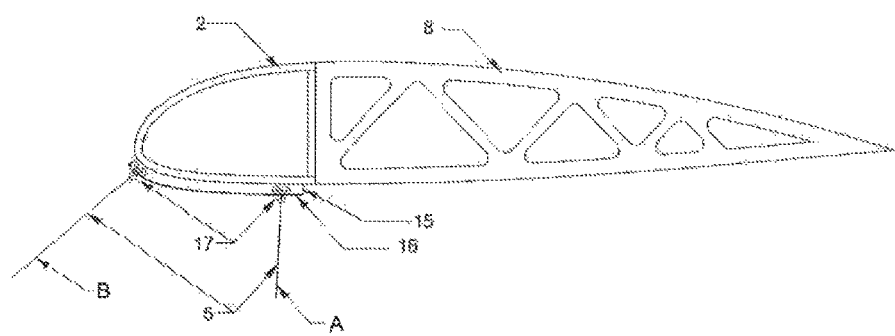
Figure 5A:
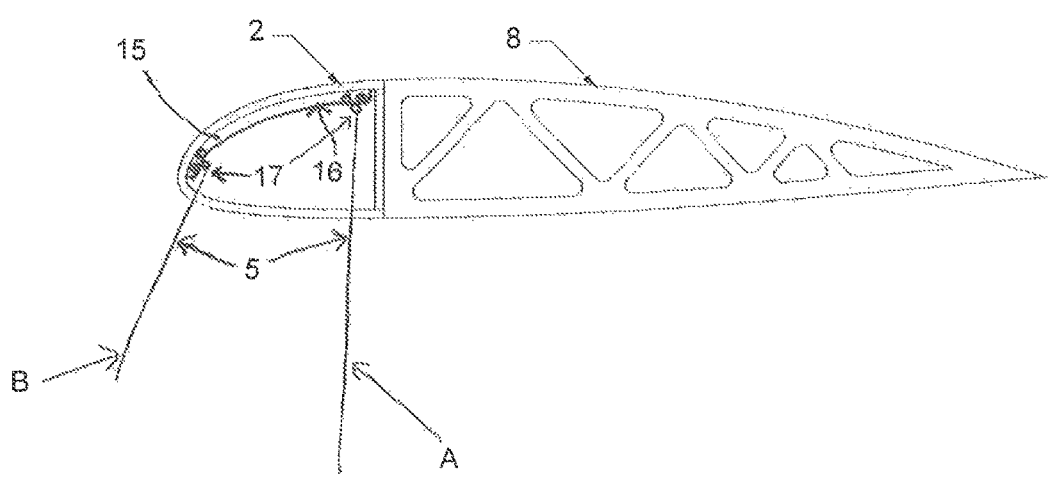

Example 5 (FIG. 5): describes a wing as shown in FIG. 4, in which the, if necessary, branched wing bridle but without branched tether related wing bridle is formed by a connection element (17) guided from the front to the rear, to which the main tether (5) is directly attached, where the connection element at the lower area of the D-shaped spar profile (2), is attached as in the profile chord. FIG. 5A describes a wing as shown in FIG. 4, in which the, if necessary, branched wing bridle but without branched tether related wing bridle is formed by a connection element (17) guided from the front to the rear, at which the main tether (5) is directly attached, where the connection element at the upper area of the D-shaped spar profile (2), is attached as in the profile chord. Wing bridle or main tether can move forward and backward along the connection element.

Figure 6:
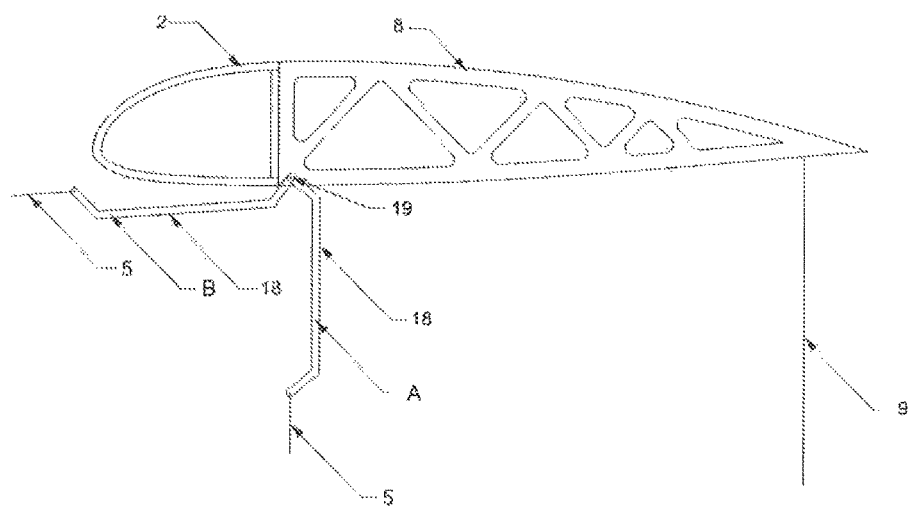

Example 6 (FIG. 6): describes an external wing bridle connectivity within the invention-related wing design. Alternatively to the design as shown in FIG. 5, one rigid connection (18) with joint (19) is suggested which, in particular, is characterized by the fact that the pivot point lies in the profile chord—i.e. in the imaginary connection line between the front edge and rear edge of the wing. Here it is initially proposed to integrate joint (19) into the profile elements (8).

Alternatively, the connection can also be attached in the front area of the profile spar (2). In addition, an external of discontinuous, guided and sliding is proposed, which preferably is firmly integrated into the profile element (8). Alternatively, the joint or the external displacement of the connection point can be realized by means of sliding surfaces on the spar. The described wing-brindle connection in the profile chord has the advantage that it results in a minimized wing deflection or one well coordinated to the control forces right up to minimized angles of approach in the recovery operation. This becomes especially efficient so that the recovery resistance is minimized. The high lift elements at the front edge are for interruption; so that they do not collide with the tether which varies by approx. 90°.

Figure 7:
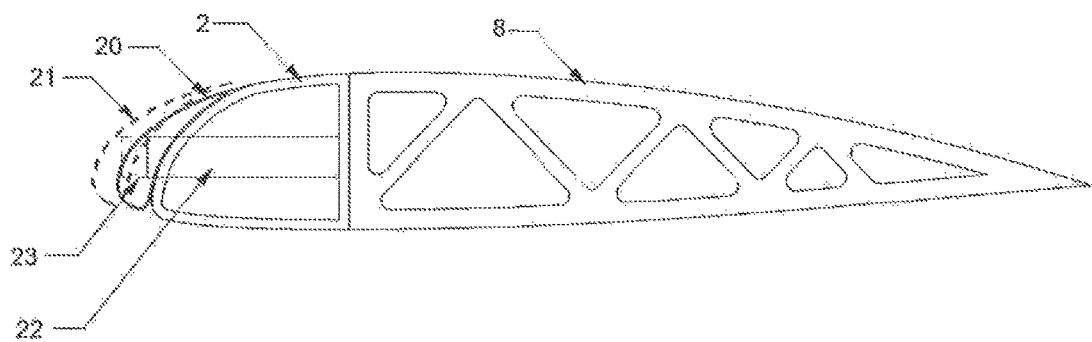

Example 7 (FIG. 7): shows a cross-section of an invention-related wing as in FIG. 4 (shown without wing bridle) which exhibits an extendable and retractable slat (21) (20) by means of a forward and backward movable thruster (22).

Figure 8:
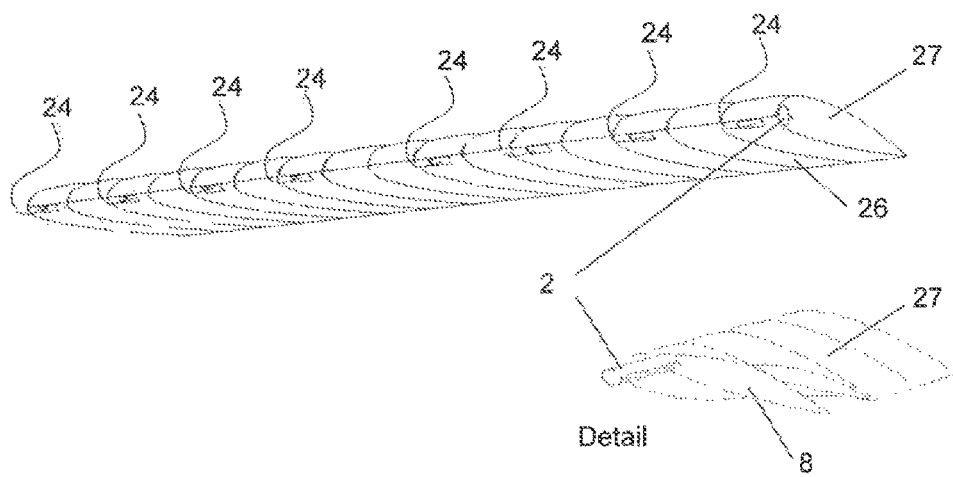

Example 8 (FIG. 8): describes an invention-related wing. It consists of the spar, which is connected either in part or completely with the rib elements as well as the membrane elements. Through the existing ram pressure openings (24) in individual profile segments formed by at least two profile elements (8), a differential pressurization, e.g. is feasible through ram pressure.

Example 9 (not shown) describes another embodiment in such a way that the flexible textile surfaces, as a closed half shell in a type of casing, are pulled over the spar-rib structure and braced against each other at the central level of the connection. For the connection elements of the bridle and the slats, these designs contain the corresponding recesses which in particular after the assembly, produce a water or storm-tight closure between the bending-torsion rigid structure and the flexible shear-resistant membrane elements.

Example 10 (not shown) describes a possible embodiment of the spar with internal lightning protection, in such a way that a light aluminum tube is used as internal cable routing which results in a lightning channel to the connection points, wherein the tether connection is designed so that the mixture of non-conductive and conductive materials enables the realization of an ionized lightning channel. The respective connection points and tethering realize a possible path for lightning towards the ground in such a way that even in case of the destruction of a conductor path, i.e. a connection load path, the wing system can still be landed safely.

MORE DETAILED DESCRIPTION OF THE INVENTION

In a preferred embodiment, the invention-related wing design includes a multi-part wing bridle (5, 6, 7, 12, 13) consisting of tensile tethers, single, branched or multiply branched. Alternatively, the invention-related wing design has guidance devices (15, 16, 17) in the area of the profile spar (2), making it possible that the central bridle line (4) and/or the connection element (18, 19) and/or the wing bridles (5, 6, 7, 12, 13) can be moved backwards and forwards, so that the said elements can take a lateral or transverse position to the wing or also positions in between.

The profile spar (2) has a D-form (closed) according to the invention or an open U-shape and is made of a hard but flexible material, preferably of plastic. Typically, the connection devices (3, 4, 5, 6, 7, 18, 14) are attached in the area of the largest load impact, so preferably in the area of the profile spar (2). In doing so, said elements can be in the lower part of the spar profile body outside or also on the inside of the upper part of the profile spar. In a special embodiment, the invention-related wing design has guidance devices (15, 16, 17), which are attached to the outer surface of the bottom of the profile spar (2) (See, FIG. 5), or alternatively, on the inner surface of the top of the profile spar (2) (See, FIG. 5A).

Preferably, the invention-related wing design has a wing bridle, where the main tether (5) is connected to the outer bridle lines (6) of the wing bridle, if necessary, via guide pulleys (14).

In another embodiment, the wing design can exhibit one rigid connection element (18) that is preferably connected to the wing in its longitudinal center via a joint which is movable in all directions. In this case, the main tether (5) is connected directly with the rigid connection element (18).

In a further embodiment of the invention, the upper and lower sail (25, 26) are connected to each other in span-wise direction via a flexible, fluid-elastic curved front edge (1a) made of film or membrane.

Furthermore, the sail elements and/or the rigid support elements can be fiber-reinforced or have a structural reinforcing matrix with the invention-related wing design.

In a preferred embodiment, the invention-related wing design exhibits profile segments which have ram pressure openings (24) in the area of the front edge. For example, every or every second or third profile segment can have such a ram pressure opening, which can improve the flight characteristics and the control of the wing.

A further improvement can be achieved by moving controllable slat elements (20) (21) in the area of the front edge of the invention-related wing design, where the slat elements can be controlled by changing the angle from the ground station.

The control of the invention-related wing design can be done according to the invention and in an advantageous manner in the area of the rear edge of the wing by elastic elements without the use of butterfly valves or other similar setting devices.

The invention-related wing design can be also modularly constructed from individual profile segments, which are separately transportable and can be coupled to each other at the operation site where the coupling is done in the area of the load transmission level or bridle points.

The invention-related wing design is mainly suitable for the generation of electrical energy in airborne wind turbines with a stationary or mobile ground station, instead of the rotor or in addition to the rotor in conventional wind turbines, primarily in the yoyo operation. In particular, the invention-related wing design is suitable in the presence of two completely separated operating points, which include energy generation in the working phase and the fast and efficient recovery phase of the aircraft where the control can only be done from the ground via retaining and control tethers.

The connection of flexible membrane elements to stiff profile elements and beams can be solved by form-fitting closure (piping, loops), force-fitting closure (terminal connection) and chemical closure (adhesive bonding). The combination of fiber-reinforced composites with film laminate is innovative here so that a steady force distribution takes place through the direct embedding of the reinforcing fibers of the respective elements in a joint e.g. thermoplastic matrix. The reinforcement fibers can thus be directly laid from the rigid structure into the sail areas according to load.

To achieve optimum aerodynamic properties, the bending/torsion beam can already exhibit an aerodynamically shaped cross-section, e.g. in the area of the front edge and be supplemented by high lift devices, e.g. in the form of slats. These high lift devices meet the invention-related purpose especially if they can be variably adapted to the flight conditions or form passively and automatically e.g. in the event of energy generation or takeoff and landing and reform in the event of recovery. This is achieved through a coordinated spring mechanism which is in equilibrium with the different pressure distributions of various flight conditions on the wing or is triggered at least by a change in the pressure distribution or wing location and position. This high lift device can be supplemented by the impressing of so-called tubercles on the leading edge resulting in a major gain for the airborne wind turbines in flight stability and lift or energy yield with a longer presence of flow at large approach angles. These tubercles can be regarded as a sinusoidal modulation of the front edge geometry where the wavelength and amplitude is usually not selected less than the thickness of the profile which remains unchanged.

Furthermore, this invention includes also the optimized tethering of the wing structure through a branched bridle which realizes the load transfer and the approach angle change up to the negative range and, if necessary, roll angle change of the wing on the one hand and a weight reduction of bending-torsion beams on the other hand. Specifically, this is done for the lateral angle by an articulated connection with pivot point near the airfoil chord which usually runs within the bending torsion beam between the front and rear edge of the wing and through the use of split slats.

The invention described here includes the possibility of the implementation of flexible and adaptive actuators for passive and active control in combination with elastic profile elements in certain areas. For this, the flexible surface elements are replaced in certain areas especially in the less pressurized area of the rear edge by stretchable, elastic elements, which follow a inside or outside actuated profile deformation with coordinated restoring forces. In this way, control moments are imposed on the wing system without the need for a complicated flap mechanism.

The rib profiles (8) with identical shape for the simple manufacture can, for example, be attached via a variable adapter to the spar in order to satisfy sweeping and twisting.

Definitions

Bend-proof structural elements are beams, pipes and shell structures which counter a deformation transverse to its longest dimension with great resistance. Commonly, highly elastic restoring forces and torques occur with deformations.

Flexible textile surfaces are membranes, films and reinforced laminates which are exposed to only one plane stress condition as a result of tensile and shear deformation and counter a deformation transverse to the surface with only a very low resistance.

The projected area of the surface area of the outer contour of the aircraft, projected in the direction of its smallest dimension (dimension: $m^2$).

Maximum surface load is the sum of the maximum permitted tether forces on the aircraft, projected in the direction of the smallest dimension of the aircraft and based on the projected area (dimension: $N/m^2$).

In terms of the invention, the forces which are maximally allowed are those that maintain the usability of the aircraft without causing the failure of components or inadmissible deformations that affect the safe and efficient operation.

Surface weight is the mass of the aircraft based on its projected area (dimension: $N/m^2$).

In the following, the reference parameters used above and below are described:

1 flexible, pliable membrane or film surface element
2 rigid, elastic bending torsion beam (spar) in profile shape
3 connection of the central bridle to the spar
4 central bridle line to wing
5 main tether
6 exterior bridle lines (optional, circulatory)
7 deflecting element (optional to ensure the rolling degree of freedom)
8 profile element
9 instructions for the control
10 spring element if necessary as rail
11 spar—rip connection or joint
12 wing bridle
13 tethering points for wing bridle
14 guide pulley for wing bridle
15 guide element
16 engagement point
17 guided connection element
18 rigid connection element
19 joint/bearing
20 slat retracted
21 slat extended
22 actuating element retracted
23 actuating element extended
24 entrance openings
25 surface element upper sail (airtight)
26 surface element lower sail (airtight)
27 profile element as wing end (airtight)

The invention claimed is:

1. An airborne wind turbine comprising
(a) a stationary or a mobile ground station; and
(b) at least one passive, wind-driven wing having tether-guided, tensile, extending and controlling devices (5, 6, 12) and controllers (9) that are connected with and controlled from said stationary or mobile ground station, wherein the airborne wind turbine is configured to convert flow energy, generated by wind, into electrical energy, and said at least one wind-driven wing comprises:
  (i) a hard but elastic supporting crossbeam profile spar (2) which extends in a span-wise direction of the at least one wind-driven wing across a leading edge of the at least one wind-driven wing, the profile spar forming a base on which, via joints or connecting elements (11), hard non-flexible profile elements (8) are attached, which define a shape of the at least one wind-driven wing and form separate profile segments;
  (ii) an upper sail portion (25) formed from a first flexible membrane, laminate or film material;
  (iii) a lower sail portion (26) formed from a second flexible membrane, laminate or film material, wherein said upper and lower sail (25, 26) portions join said profile elements (8) together under tension;
  (iv) at least one central bridle line (4) located in a middle of the at least one wind-driven wing, so that free rotation of the at least one wind-driven wing in the form of lateral and yaw and roll movements is possible;
  (v) a multi-part wing bridle (12) comprising one or more main tethers (5) and outer bridle tethers (6), and deflecting elements (7) or guide pulleys (14) which ensure a rolling degree of freedom, wherein said wing bridle is arranged on or adjacent to the profile spar (2),
whereby the at least one wind-driven wing is operated via the stationary or mobile ground station in a yoyo operation mode by raising and lowering of the at least one wind-driven wing in two completely separated operating points which include an energy generating working phase and a recovery phase.

2. The wind turbine according to claim 1, further comprising a guidance device (15, 16, 17) attached to the profile spar (2) for positioning the tethers (5, 6), the central bridle line (4) and/or one or more rigid articulated connection elements (18, 19) relative to the longitudinal axis of the at least one wind-driven wing.

3. The wind turbine according to claim 1, wherein the upper and the lower sail portions (25, 26) are connected, in the span-wise direction of the at least one wind-driven wing, via a flexible, fluid-elastic curved leading edge (1*a*) made of a film or a membrane.

4. The wind turbine according to claim 1, wherein the profile spar, the profile elements, and the upper and lower sail portions are fiber-reinforced or have a structural reinforcing matrix.

5. The wind turbine according to claim 1, further comprising at least one rigid or movable slat element (20, 21) located proximal to a leading edge of the profile segment.

6. The wind turbine according to claim 5, wherein the at least one movable slat element (20, 21) is controlled by a change in angle from the ground station relative to a leading edge of the profile spar (2).

7. The wind turbine according to claim 1, wherein control of the at least one wind-driven wing in the area of a rear edge of the at least one wind-driven wing is by elastic elements and without the use of butterfly valves or other similar devices.

8. The wind turbine according to claim 1, wherein the at least one wind-driven wing has a surface load of between 50 and 150 kg/m$^2$, a surface weight of 2-5 kg/m$^2$, and operates at a power output of up to 20 kW/m$^2$.

9. The wind turbine according to claim 1, wherein the at least one wind-driven wing comprises two or more separate profile segments which can be individually transported and, at an operation site, be coupled to one another in an area of load transmission levels or bridle points.

10. An airborne wind turbine comprising:
   (a) a stationary or a mobile ground station; and
   (b) at least one passive, wind-driven wing having tether-guided tensile, and extending devices (5, 6, 12) and at least one controller (9) that are connected with and controlled from said stationary or mobile ground station, wherein the airborne wind turbine is configured to convert flow energy, generated by wind, into electrical energy, the at least one wind-driven wing comprises:
   (i) a hard but elastic supporting crossbeam profile spar (2) which extends in a span-wise direction of the at least one wind-driven wing, the profile spar forming a base on which, via joints or connecting elements (11), hard non-flexible profile elements (8) are attached, which define a shape of the at least one wind-driven wing and form separate profile segments;
   (ii) an upper sail portion (25) formed from a first flexible membrane, laminate or film material;
   (iii) a lower sail portion (26) formed from a second flexible membrane, laminate or film material, wherein said upper and lower sail (25, 26) portions join said profile elements (8) together under tension;
   (iv) at least one central bridle line (4) located in a middle of the at least one wind-driven wing, so that free rotation of the at least one wind-driven wing in the form of lateral and yaw and roll movements is possible;
   (v) a multi-part wing bridle (12) comprising one or more main tethers (5) and outer bridle tethers (6), and deflecting elements (7) or guide pulley (14) which ensure a rolling degree of freedom, wherein said wing bridle is arranged on or adjacent to the profile soar (2);
   wherein each or every second or third profile segment further comprises a ram pressure opening (24) located proximal to a front leading edge of the profile segment.

\* \* \* \* \*